United States Patent
Kuriu

(12)
(10) Patent No.: US 6,645,640 B1
(45) Date of Patent: Nov. 11, 2003

(54) MULTILAYERED POLYAMIDE FILM WITH EXCELLENT PROCESSABILITY

(75) Inventor: Hiroki Kuriu, Moriyama (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/937,242

(22) PCT Filed: Mar. 22, 2000

(86) PCT No.: PCT/JP00/01748

§ 371 (c)(1),
(2), (4) Date: Sep. 20, 2001

(87) PCT Pub. No.: WO00/56548

PCT Pub. Date: Sep. 28, 2000

(30) Foreign Application Priority Data

Mar. 23, 2000 (JP) .............................................. 11-77266

(51) Int. Cl.[7] .............................................. B32B 27/00
(52) U.S. Cl. .................................. 428/474.4; 428/475.5; 428/476.1; 428/476.3; 428/476.9
(58) Field of Search ........................... 428/474.4, 475.5, 428/476.1, 476.3, 476.9

(56) References Cited

U.S. PATENT DOCUMENTS 5,185,189 A * 2/1993 Stenger et al. ........... 138/118.1
5,286,575 A * 2/1994 Chou ...................... 428/474.4
5,562,996 A * 10/1996 Kuriu et al. ............. 428/474.4
5,688,456 A * 11/1997 Kuriu et al. ........... 264/173.14

FOREIGN PATENT DOCUMENTS

| EP | 0 527 237 A1 | 2/1993 |
| EP | 0 585 459 A1 | 3/1994 |
| EP | 0 960 903 A2 | 12/1999 |
| EP | 1 018 424 A1 | 7/2000 |
| JP | 5-492 | 1/1993 |
| JP | 5-57855 | 3/1993 |
| JP | 5-64868 | 3/1993 |
| JP | 10-80989 | 3/1998 |
| JP | 10-151714 | * 6/1998 |

* cited by examiner

Primary Examiner—P. Hampton-Hightower
(74) Attorney, Agent, or Firm—Knobbe, Martens, Olson & Bear LLP

(57) ABSTRACT

The present invention provides a multilayered polyamide film having at least two polyamide resin layers, which develops less than 10 pinholes when evaluated for pinhole resistance by flexing it 1,000-times at 25° C. and which has an elongation of 6 mm or less at 120° C. in vertical pitch evaluation. This film has excellent resistance to pinholes and is well suited for lamination.

11 Claims, No Drawings

MULTILAYERED POLYAMIDE FILM WITH EXCELLENT PROCESSABILITY

TECHNICAL FIELD

The present invention relates to a multilayered polyamide film with improved resistance to pinholes, particularly to a multilayered polyamide film which maintains a stable pitch in the running direction during printing or lamination and is well suited for lamination.

BACKGROUND ART

Conventionally, multilayer films containing a polyamide resin have been widely used in various fields because of their gas barrier properties, toughness, etc. The market requires further improvement of film toughness, especially the resistance to pinholes.

To realize further improvement in pinhole resistance, however, the polyamide resin layer needs to be softened. Softening of the polyamide resin layer tends to cause the film to stretch in the running direction (the machine direction) during printing or lamination. Consequently, a problem arises regarding pitch accuracy in the machine direction.

DISCLOSURE OF INVENTION

To solve the problem of the prior art, the inventors focused on the relationship between the softness of the film and the amount of stretch in the machine direction, and achieved the present invention. A primary object of the present invention is to improve pinhole resistance and pitch accuracy in the machine direction, thus achieving improved gas barrier properties and more stable processability compared to the prior art.

The present invention is characterized by a multilayered polyamide film comprising at least two polyamide resin layers, the film having excellent processability such that the film develops less than 10 pinholes when evaluated for pinhole resistance by flexing it 1000 times at 25° C., and has an elongation of 6 mm or less at 120° C. in pitch accuracy evaluation in the machine direction.

The multilayered polyamide film of the invention comprises at least three layers comprising in order of a polyamide resin layer, a saponified ethylene-vinyl acetate copolymer layer and a polyamide resin layer, or at least three layers comprising in order of a polyamide resin layer, a xylylene diamine polyamide resin layer and a polyamide resin layer.

The multilayered polyamide film of the invention comprises at least three layers and may have, for example, a three-layer, five-layer or seven-layer structure. Examples of five-layer structure films include a film consisting of a polyamide resin layer, a saponified ethylene-vinyl acetate copolymer layer, a polyamide resin layer, a modified polyolefin adhesive resin layer and a linear low density polyethylene, and a film consisting of a polyamide resin layer, a xylylene diamine polyamide resin layer, a polyamide resin layer, a modified polyolefin adhesive resin layer and a linear low density polyethylene. Examples of seven-layer structure films include a film consisting of a linear low density polyethylene, a modified polyolefin adhesive resin layer, a polyamide resin layer, a saponified ethylene-vinyl acetate copolymer layer, a polyamide resin layer, a modified polyolefin adhesive resin layer and a linear low density polyethylene, and a film consisting of a linear low density polyethylene, a modified polyolefin adhesive resin layer, a polyamide resin layer, a xylylene diamine polyamide resin layer, a polyamide resin layer, a modified polyolefin adhesive resin layer and a linear low density polyethylene.

There is no specific limitation on the polyamide for forming the polyamide resin layers of the invention. Examples of useful polyamides include nylon 6, nylon 66, nylon 12 and copolymers thereof, nylon 6T/6I, nylon MXD-6 and the like. These polyamides may be used in combinations of two or more. Further, in order to increase the pinhole resistance of the film, a modified ethylene-vinyl acetate copolymer may be added as a component for giving flexibility to the film.

The polyamide resin layer preferably comprises 99 to 85 wt. % of a polyamide and 1 to 15 wt. % of a modified ethylene-vinyl acetate copolymer, more preferably 99 to 90 wt. % of the former and 1 to 10 wt. % of the latter, particularly 97 to 93 wt. % of the former and 3 to 7 wt. % of the latter.

Examples of modified ethylene-vinyl acetate copolymers include (1) resins with partially saponified —OCOCH$_3$, (2) resins produced by partially substituting —OCOCH$_2$CH$_3$ for —OCOCH$_3$ and (3) resins resulting from partial graft polymerization of an acid anhydride such as maleic anhydride.

There is no specific limitation on the saponified ethylene-vinyl acetate copolymer. Examples of saponified ethylene-vinyl acetate copolymers include copolymers with an ethylene content of about 20 to 65 mole %, preferably about 29 to 44 mole %, and with a saponification degree of about 90% or higher, preferably about 95% or higher. There is no specific limitation on the xylylene diamine polyamide resin. Examples of useful xylylene diamine polyamide resins include polymers synthesized from m- and/or p-xylylene diamine and a dicarboxylic acid such as adipic acid.

The film of the invention may contain different kinds of polymers as long as they do adversely affect the object of the invention and may contain organic additives such as antioxidants, thermal stabilizers, lubricants, UV absorbents and the like in typical amounts.

The total thickness of the film of the invention is about 10–40 μm, preferably about 12–25 μm. The thickness of each of the polyamide resin layers in the film, of which there are at least two, is about 3–15 μm, preferably about 5–10 μm. The thickness of the saponified ethylene-vinyl acetate copolymer layer is about 2–10 μm, preferably about 3–10 μm. The thickness of the xylylene diamine polyamide resin layer is about 2–10 μm, preferably about 3–10 μm.

The flat polyamide multilayer film of the invention can be obtained, for example, by co-extruding the resin layers from a T-die and superposing the layers in an appropriate order onto a chilled roll where cooling water is circulating. The film thus obtained is stretched to 2 to 4 times its original size in the machine direction, for example, at 50 to 100° C. using a roll stretching machine. Then the film is stretched to 2 to 5 times its original size in the transverse direction at an atmospheric temperature of 90 to 150° C. using a tenter stretching machine. Subsequently, the film is thermally treated at an atmospheric temperature of 80 to 220° C. using the tenter stretching machine. The multilayer film of the invention may be subjected to monoaxial stretching or biaxial stretching (simultaneous or sequential). The multilayer film may be treated with corona discharge surface treatment on one or both sides, if necessary.

With regard to pinhole resistance, the multilayer film of the invention develops less than 10 pinholes when evaluated for pinhole resistance by flexing it 1,000 times at 25° C.

Preferably, the number of pinholes is 6 or less, more preferably 2 or less. Ten or more pinholes indicate no substantial improvement in pinhole resistance. If products are packaged with such film, pinholes tend to occur during actual transportation.

The multilayer film of the invention has an elongation of 6 mm or less at 120° C. in vertical pitch evaluation. Preferably, the amount of elongation is 5 mm or less. When the amount of elongation is 6 mm or less in vertical pitch evaluation, the film maintains a stable pitch in the machine direction during actual printing and lamination, so that no problems will arise in the post-processing process of forming the film into a bag. By contrast, when the amount of elongation is more than 6 mm in vertical pitch evaluation, the film is prone to stretch due to the tension applied during printing or lamination, resulting in a large deviation and variation from the normal pitch. Such low pitch accuracy causes problems in the post-processing process of forming the film into a bag.

The temperature of 120° C. was chosen for the vertical pitch evaluation because this is the maximum temperature to which films are usually exposed during actual printing and lamination.

The multilayer film of the invention has high toughness and excellent resistance to pinholes and is thus suitable for packaging heavy items, especially rice cakes, liquid items such as soups and the like.

BEST MODE FOR CARRYING OUT THE INVENTION

The present invention will be described below in more detail with reference to Examples and Comparative Examples. The following methods were used to measure the characteristic properties of the invention.

Pinhole Resistance Evaluation

Pinhole resistance was evaluated using a Gelbo flex tester manufactured by Rikagaku Kogyo K.K., in the following manner. Each sample film was formed into a cylindrical bag 150 mm in width when laid flat and 300 mm long. The bag was attached to the Gelbo flex tester and flexed 1,000 times at 25° C. at a torsional angle of 440° and with a twist and linear motion of 15.0 cm. Then, using a penetrant, the number of pinholes formed on the central portion of the sample (measuring area: 300 cm$^2$) was counted.

Vertical Pitch Evaluation

The vertical pitch was evaluated in the following manner. Each sample was cut into long strips. Then 600 g of load was applied to the strip at an atmospheric temperature of 120° C. to measure the amount of elongation of a 40 mm line drawn on the central portion of the sample.

EXAMPLE 1

A polyamide resin (a composition consisting of 96.0 wt. % of nylon 6 and 4.0 wt. % of a modified ethylene-vinyl acetate copolymer), a saponified ethylene-vinyl acetate copolymer (ethylene content: 32 mole %, saponification degree: 99%), and a polyamide resin (a composition consisting of 96.0 wt. % of 6-nylon and 4.0 wt. % of a modified ethylene-vinyl acetate copolymer; trade name "NAV102X23", manufactured by Ube Industries, Ltd.) were coextruded from a T-die to form a flat film of three layers superposed in said order on a chilled roll while cooling water was circulating. The film was then stretched to 3.0 times its original size in the machine direction at 65° C. using a roll stretching machine and stretched to 4.0 times its original size in the transverse direction at an atmospheric temperature of 110° C. using a tenter stretching machine. Subsequently, the film was thermally treated at an atmospheric temperature of 210° C. using the tenter stretching machine to form a 15 μm-thick film. The layers of the resulting film had thicknesses of 6 μm, 3 μm and 6 μm in order from the surface.

EXAMPLE 2

A 15 μm-thick multilayer film was formed in the same manner as in Example 1 except that a composition consisting of 86.0 wt. % of nylon 6, 10.0 wt. % of poly(m-xylylene adipamide) resin synthesized from m-xylylene diamine and adipic acid, and 4.0 wt. % of a modified ethylene-vinyl acetate copolymer was used in place of the polyamide resin used in Example 1. The layers of the resulting film had thicknesses of 6 μm, 3 μm and 6 μm in order from the surface.

EXAMPLE 3

A 15 μm-thick multilayer film was formed in the same manner as in Example 1 except that poly(m-xylylene adipamide) resin synthesized from m-xylylene diamine and adipic acid was used in place of the saponified ethylene-vinyl acetate copolymer used in Example 1. The layers of the resulting film had thicknesses of 5 μm, 5 μm and 5 μm in order from the surface.

Comparative Example 1

A polyamide resin (a composition consisting of 85.0 wt. % of nylon 6 and 15.0 wt. % of an amorphous copolymer nylon comprising hexamethylenediamine, terephthalic acid and isophthalic acid), a saponified ethylene-vinyl acetate copolymer (ethylene content: 32 mole %, saponification degree: 99%), and a polyamide resin (a composition consisting of 85.0 wt. % of nylon 6 and 15.0 wt. % of an amorphous copolymer nylon comprising hexamethylenediamine, terephthalic acid and isophthalic acid) were coextruded from a T-die to form a flat film of three layers superposed in said order on a chilled roll while cooling water was circulated. The film was then stretched to 3.0 times its original size in the machine direction at 65° C. using a roll stretching machine and stretched to 4.0 times its original size in the transverse direction at an atmospheric temperature of 110° C. using a tenter stretching machine. Subsequently, the film was thermally treated at an atmospheric temperature of 210° C. using the tenter stretching machine to form a 15 μm-thick film. The layers of the film had thicknesses of 6 μm, 3 μm and 6 μm in order from the surface.

Comparative Example 2

A 15 μm-thick multilayer film was formed in the same manner as in Comparative Example 1 except that a composition consisting of 75.0 wt. % of nylon 6, 20.0 wt. % of an amorphous copolymer nylon comprising hexamethylenediamine, terephthalic acid and isophthalic acid, and 5.0 wt. % of a modified ethylene-vinyl acetate copolymer was used in place of the polyamide resin used in Comparative Example 1. The layers of the film had thicknesses of 6 μm, 3 μm and 6 μm in order from the surface.

Comparative Example 3

A 15 μm-thick multilayer film was formed in the same manner as in Comparative Example 1 except that poly(m-xylylene adipamide) resin synthesized from m-xylylene diamine and adipic acid was used in place of the saponified ethylene-vinyl acetate copolymer used in Comparative Example 1. The layers of the film had thicknesses of 5 μm, 5 μm and 5 μm in order from the surface.

The multilayer films described in the Examples may optionally be treated with corona discharge surface treatment on one or both sides.

The physical properties of the multilayer films obtained in the Examples and Comparative Examples are shown in Tables 1 and 2 below. The tables show data on the films obtained in the Examples and Comparative Examples and treated on one side with corona discharge surface treatment.

TABLE 1

| Item | Example 1 | Example 2 | Example 3 | Test method and unit |
|---|---|---|---|---|
| Pinhole resistance evaluation | 0 | 0 | 6 | Number of pinholes |
| Vertical pitch evaluation | 4.7 | 3.8 | 4.1 | mm |
| Processability (Printing) | A | A | A | Test method 1 |
| Processability (Dry lamination) | A | A | A | |
| Processability (Extrusion lamination) | A | A | A | |
| Vibration test | A | A | A | Test method 2 |

TABLE 2

| Item | Comp. Ex. 1 | Comp. Ex. 2 | Comp. Ex. 3 | Test method and unit |
|---|---|---|---|---|
| Pinhole resistance evaluation | 20 | 0 | 25 | Number of pinholes |
| Vertical pitch evaluation | 6.3 | 7.1 | 3.8 | mm |
| Processability (Printing) | A | B | A | Test method 1 |
| Processability (Dry lamination) | A | B | A | |
| Processability (Extrusion lamination) | C | C | A | |
| Vibration test | B | A | B | Test method 2 |

Test Method 1

Each sample film was processed using a printer and laminator. The printing pitch deviation was evaluated on an A to C scale.

A: No pitch deviation.

B: A pitch deviation occurs under certain processing conditions.

C: A pitch deviation occurs; the film is less suitable for processing.

More specifically, the test methods are as follows:

Processability (printing): an image was produced on the sample film at a printing speed of 200 m/s using a gravure printer. The printing pitch deviation was evaluated on an A to C scale.

Processability (dry lamination): a linear low density polyethylene film having a thickness of 50 μm was dry laminated at a laminating speed of 150 m/s using a dry laminator. The printing pitch deviation was evaluated on an A to C scale.

Processability (extrusion lamination): A linear low density polyethylene was extrusion laminated to a thickness of 50 μm at a laminating speed of 120 m/s using an extrusion laminator. The printing pitch deviation was evaluated on an A to C scale.

Test Method 2

Each laminated sample film was formed into bags (220 mm×320 mm) and 1 kg of rice cakes was packed into each bag. Ten bags containing rice cakes were placed in one box (280 mm×370 mm×230 mm) and stacked in 5 rows of 2. Then the box was placed on a vibration tester and vibrated for 30 minutes. Thereafter, the sample was taken out and the occurrence of pinholes was evaluated on an A to B scale.

A: No pinholes occur.

B: Pinholes occur; the film has poor pinhole resistance.

Table 1 shows that the films of the present invention have remarkable pinhole resistance and maintain stable vertical pitch accuracy in actual printing and lamination. In contrast, as is evident from Table 2, the films obtained in the Comparative Examples have poor resistance to pinholes and/or are not well suited for processing.

The present invention provides a multilayered polyamide film with the special property of excellent pinhole resistance, which has been greatly desired in the market, and improved suitability for printing and lamination. This film can be widely used for a variety of purposes and is suited, for example, for food packaging, etc.

What is claimed is:

1. A multilayered polyamide film comprising at least two polyamide resin layers, the film having excellent processability such that the film develops less than 10 pinholes when evaluated for pinhole resistance by being flexed 1000 times at 25° C., and has an elongation of 6 mm or less at 120° C. in vertical pitch evaluation, wherein at least one of said polyamide resin layers comprises 97 to 93 weight % of polyamide and 3 to 7 weight % of a modified ethylene-vinyl acetate copolymer.

2. The multilayered polyamide film according to claim 1 which comprises at least three layers comprising in order a polyamide resin layer, a saponified ethylene-vinyl acetate copolymer layer and a polyamide resin layer.

3. The multilayered polyamide film according to claim 1 which comprises at least three layers comprising in order a polyamide resin layer, a xylylene diamine polyamide resin layer and a polyamide resin layer.

4. The multilayered polyamide film according to claim 1 wherein the polyamide is at least one member selected from the group consisting of nylon 6, nylon 66, nylon 12 and copolymers thereof, nylon 6T/6I and nylon MXD-6.

5. The multilayered polyamide film according to claim 1 which has a thickness of about 10–40 μm.

6. The multilayered polyamide film according to claim 2 wherein the saponified ethylene-vinyl acetate copolymer contains about 20–65 mole % of ethylene and has a saponification degree of about 90% or higher.

7. The multilayered polyamide film according to claim 3 wherein the xylylene diamine polyamide resin is poly(m-xylylene adipamide) and/or poly(p-xylylene adipamide).

8. The multilayered polyamide film according to claim 1 which is treated with corona discharge surface treatment on one or both sides.

9. The multilayered polyamide film according claim 1, which has a thickness of about 12 to 15 μm.

10. The multilayered polyamide film according to claim 1, which comprises at least three layers of a polyamide resin layer, a saponified ethylene-vinyl acetate copolymer layer and a polyamide resin layer in order of mention, the film having a thickness of about 12 to 15 μm, wherein polyamide comprised in at least one of said polyamide resin layers is nylon 6 or a mixture of nylon 6 and poly(m-xylylene adipamide).

11. The multilayered polyamide film according claim 1, which comprises at least three layers of a polyamide resin layer, a poly(m-xylylene adipamide) resin layer and a polyamide resin layer in order of mention, the film having a thickness of about 12 to 15 μm, wherein polyamide comprised in at least one of said polyamide resin layers is nylon 6 or a mixture of nylon 6 and poly(m-xylylene adipamide).

* * * * *

UNITED STATES PATENT AND TRADEMARK OFFICE
CERTIFICATE OF CORRECTION

PATENT NO.     : 6,645,640 B1
DATED          : November 11, 2003
INVENTOR(S)    : Hiroki Kuriu It is certified that error appears in the above-identified patent and that said Letters Patent is hereby corrected as shown below:

<u>Title page,</u>
Item [30], Foreign Application Priority Data, the date should read
-- March 23, 1999 --

Signed and Sealed this

Third Day of February, 2004

JON W. DUDAS
*Acting Director of the United States Patent and Trademark Office*